Nov. 1, 1932. E. V. HOFFMANN ET AL 1,885,825
SHUTTER APPARATUS FOR MOVING PICTURE MACHINES
Filed Sept. 9, 1929 2 Sheets-Sheet 1
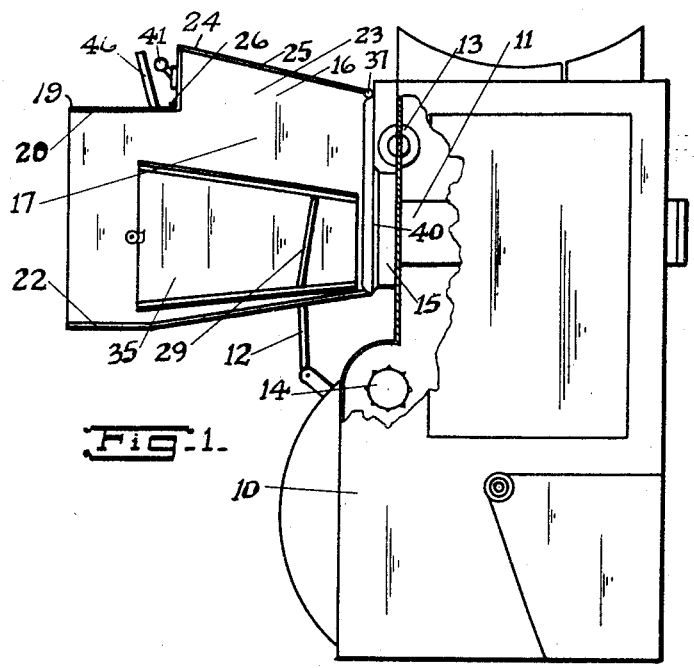
INVENTORS
ERNEST V. HOFFMANN
JAMES E. SOONS
BY
ATTORNEY

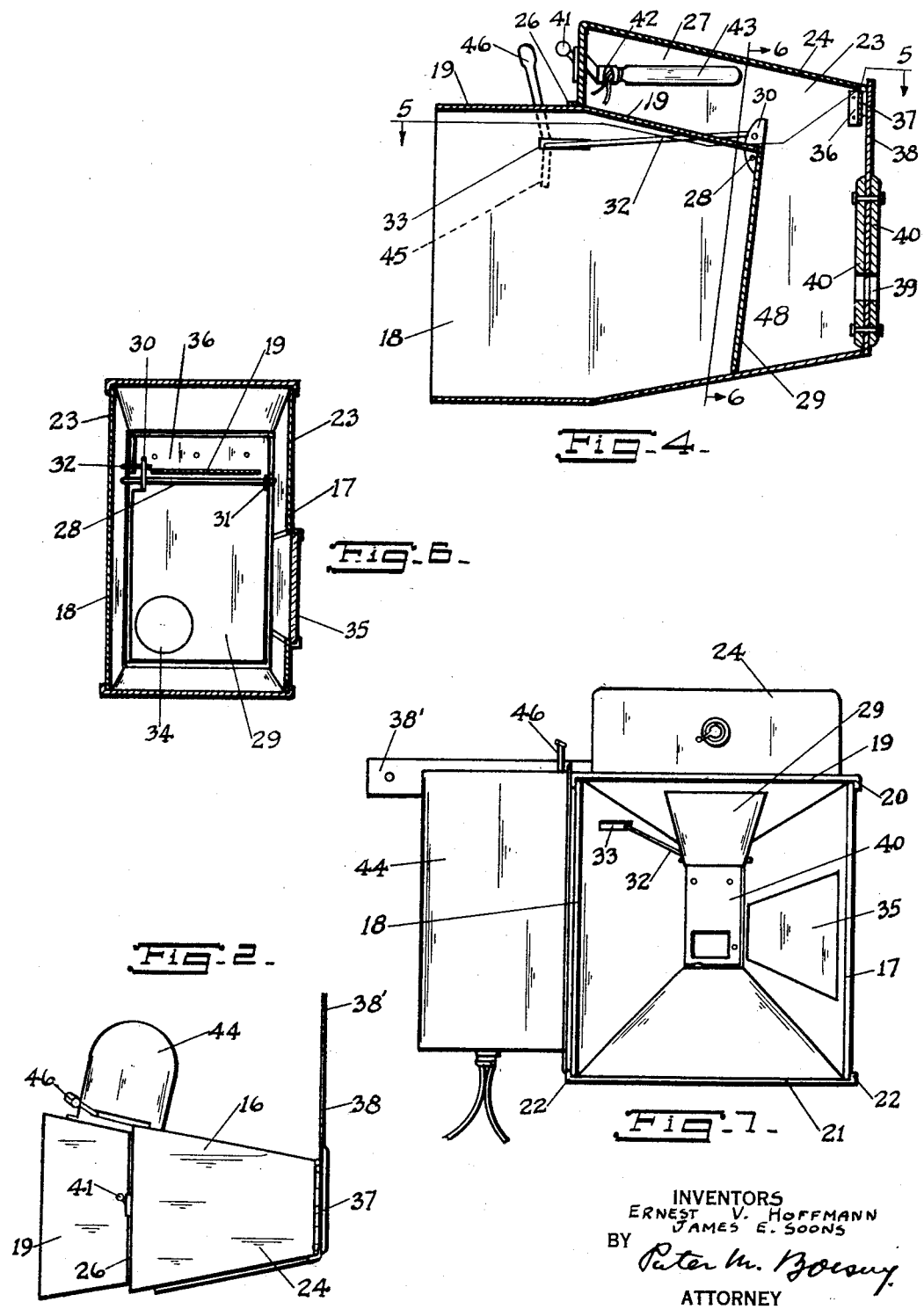

Patented Nov. 1, 1932

1,885,825

UNITED STATES PATENT OFFICE

ERNEST V. HOFFMANN, OF ST. ALBANS, AND JAMES E. SOONS, OF YONKERS, NEW YORK, ASSIGNORS TO HOFFMANN-SOONS ELECTRICAL & ENGINEERING CORPORATION, OF NEW YORK, N. Y., A CORPORATION OF NEW YORK

SHUTTER APPARATUS FOR MOVING PICTURE MACHINES

Application filed September 9, 1929. Serial No. 391,362.

This invention relates to new and useful improvements in shutter apparatus for moving picture machines, and its principal object is to provide a device of this character adaptable for corelative connection to other similar mechanisms.

A further object is to provide a shutter in combination with auxiliary means for illuminating the forward face thereof and also luminating the forward face thereof and also a space between the said shutter—when in closed position—and a lens aperture positioned in front of the same in order that the said shutter face may be used as a background for framing purposes.

A further object is the provision of a means on the rear surface of the said shutter for the purpose of centering the spot while the said shutter is in its closed position.

It is customary to mount automatic dowsers between the heat shield and the aperture of a moving picture projecting machine and at other places, but in all cases the shutter of the dowser must be opened for framing of the picture and centering of the spot. This establishes many undesirable features, the main one being that when a chain of moving picture machines are used in unitary operation, that is changing over from one to the other at the proper time, it is necessary to manually operate the shutter of the dowser for framing of the picture and for centering of the spot. The possibility is thus presented where the operator may place the machines out of time with each other, that is allow one of the shutters to remain opened when it should be closed or vice versa. This will result in embarrassment when a double picture is thrown upon the screen or when the pictures are accidentally cut off. Many other disadvantages exist in the opening of the shutter of the dowser which are generally known in the trade.

The instant invention proposes a novel positioning of the shutter, namely slightly to the rear of the aperture of the moving picture projector, and used in conjunction with a pilot light disposed for directing its light to the front of the shutter. This arrangement permits the shutter to be closed while the picture is being framed. In addition, it is proposed to inscribe a circle or other figure upon the rear face of the shutter and viewable through a window of colored glass for centering the spot. This arrangement permits the spot to be centered indirectly upon the aperture by first centering it upon the shutter. Again the shutter may remain closed while the spot is substantially centered upon the aperture.

From this brief discussion it will be clear that according to this invention there is no necessity for opening the shutter unless the machine is running. Therefore, the many disadvantages inherent in the present types of devices used for similar purposes are eliminated. The advantages gained will be recognized as obviously very desirable to any skilled in the art now that they are presented to them. In addition, the shutter may be automatically operated and the operating mechanism may be connected in a gang for the operation of motion picture machines. The motion of the shutter preferably should be pivotal though other movements may also be used such as a sliding movement.

For further comprehension of the invention and the objects and advantages thereof, reference will be had to the accompanying drawings and to the appended claims in which the various novel features of the invention are more particularly set forth.

In the accompanying drawings forming a material part of this disclosure:

Fig. 1 is a side elevational view of a device constructed according to this invention and shown applied upon a conventional projecting machine, a portion of the machine being broken away to disclose pertinent interior parts.

Fig. 2 is a plan view of the device per se.

Fig. 3 is an enlarged end elevational view of Fig. 2.

Fig. 4 is a vertical sectional view taken on the line 4—4 of Fig. 3.

Fig. 5 is a horizontal sectional view taken on the line 5—5 of Fig. 4.

Fig. 6 is a vertical sectional view taken on the line 6—6 of Fig. 4, and

Fig. 7 is a view similar to Fig. 3 but showing the shutter in its open position.

In Fig. 1 a portion of a conventional moving picture projector has been illustrated and the pertinent parts for an understanding of the instant invention may be reviewed as body 10 of the projector formed with an aperture on its rear face for communication with the lens barrel 11. The picture framing mechanism is not shown but the controlling rod 12 for this mechanism is illustrated. Numeral 13 illustrates one of the film guide rollers and 14 the intermittent roller. A flange 15, for housing the conventional automatic fire shutter is shown positioned directly in front of the rear of the body 10. Numeral 16 indicates the casing in which the elements of the invention are supported.

The casing 16 consists of a hollow body formed from vertical side-forming plates 17 and 18, a horizontal top-forming plate 19 having downturned longitudinal edges 20 engaging the top edges of the side-forming plates, and a horizontal bottom-forming plate 21 having upturned longitudinal edges 22 engaging over the bottom edges of the side-forming plates. The casing body converges from the rear to the front. The plate 19 further extends from the forward portion of its horizontal element in a downward angle to a point intermediate the front and rear ends of the casing.

Each of the side-forming plates is provided with a vertical extension 23. A cover 24 extends across these extensions. This cover is formed with downturned edges 25 for engaging the edges of the extensions and is also formed with a rear flange 26 for attachment upon the top-forming plate. The cover 24 together with a portion of the top-forming plate beneath the cover constitutes an auxiliary lighting chamber 27 from which the light is indirectly cast into the space 48 between the shutter 29 and the aperture 39.

Referring now to Figures 4 and 6, a transverse shaft 28 is mounted between the side-forming plates directly beneath the front edge of the top-forming plate. A shutter 29 is formed with lugs 30 and 31 and is pivotally supported upon said shaft 28.

A connecting rod 32 pivotally connects with lug 30 above the rod 28 and passes through an opening 33 in the side-forming plate 18. A circle or other figure 34 is inscribed upon the rear face of the shutter 29 and is arranged for aligning with the aperture of the moving picture machine. The side-forming plate 17 is formed with a window opening closed by a colored glass 35. As seen in Fig. 1, the window opening extends on both sides of the said shutter 29 when the shutter is in its closed position, the cover 24 is hinged at 37 to the front plate 38 and may be raised to give access to the upper portion of the casing.

Referring now to Figure 5; a channel 36 is positioned between the top front portions of the side-forming plates. The front plate 38 extends across the end of the casing, and a lateral arm 38' projects from the said front plate 38 and serves as a support for attaching the device upon a moving picture machine. The plate 38 see Figure 4 is formed with an aperture 39 for aligning with the aperture of the projecting machine. Front and rear fire slabs of asbestos 40 are secured upon the plate and surround the opening 39.

A switch 41 is mounted upon the cover 24 and connects with a lamp socket 42 provided with a lamp 43. A housing 44 is attached upon the outer side of the side-forming plate 18 and is adapted to enclose any operating mechanism which may be attached to the connecting rod 32, or to an extension thereon such as is indicated by the dotted lines 45.

A lever 46 provides manual means for operating the shutter 29. In Figure 3 the shutter is shown in a closed position, and is seen open in Figure 7 where it rests near to the top of the casing.

The picture may be centered by operating the switch 41 for illuminating the lamp 43. The light from the lamp passes to the front side of the shutter 29. The operator may then look in through the front of the lens barrel 11 and in a conventional method move the framing rod 12 for accomplishing the framing. After framing the light 43 is extinguished.

The spot may be substantially centered upon the aperture of the moving picture machine by centering the same upon the figure 34 inscribed on the rear surface of the shutter. The operator may look through the window 35 for this purpose; thus the centering of the spot and the framing of the picture do not necessitate the opening of the shutter.

While we have illustrated and described our invention with some degree of particularity, we realize that in practice various alterations therein may be made. We therefor reserve the right and privilege of changing the form of the details of construction or otherwise altering the arrangement of the correlated parts without departing from the spirit or the scope of the appended claims.

Having thus described our invention, what we claim as new, and desire to secure by United States Letters Patent is:

1. In an apparatus of the character described, a casing having an aperture at its forward end, an auxiliary lighting chamber in its upper portion and the said chamber extending forward to a point intermediate the front and rear ends of the said casing, a shutter element pivotally suspended below the said intermediate point, means to actuate the said shutter in a rearward arc, a pilot lamp in the said auxiliary chamber and means to reflect the light therefrom indirectly into a space behind the aperture and in front of the closure line of the said shutter.

2. In an apparatus of the character described, a casing having an auxiliary lighting chamber in its upper portion, a shutter suspended below the said chamber, a connecting rod attached to an element of the said shutter and the said connecting rod extending rearwardly and having at its free extremity means to move the said rod and through it to swing the aforesaid shutter, and means to illuminate the said auxiliary lighting chamber and means to indirectly cast the rays therefrom into a space in front of the closure line of the said shutter, and means in the side wall of the casing to permit of viewing the interior therethrough.

3. In an apparatus of the character described, a casing having a rectangular rear end and extending forwardly therefrom to a point where its top, bottom and sides are disposed in converging angles which terminate at a front end wall, an aperture in the said wall, a shutter pivotally suspended within the said casing and in spaced relation to the end wall and providing, when closed, a chamber behind the said aperture, an auxiliary lighting chamber over the top of the said casing and having a cover element in similar angle to the said casing, and the said cover element hinged to the casing and adapted to be opened at will, a pilot lamp within the said auxiliary chamber, and means connected with the said shutter to actuate the same in an arc movement on its pivotal suspension elements, and means in the casing wall to give visibility to the interior thereof.

4. An apparatus of the class described, comprising a casing having a rectangular rear portion, and upper and lower walls converging forwardly from points intermediate its front and rear ends, the lower one of the said converging walls being attached at its forward extremity to a vertical end wall, and the upper converging member terminating at a point in the rear of the said vertical wall, a casing element extending upward from the top of the main structure at the point where its angular convergence begins, and a supplementary wall extending forwardly from this casing element and at substantially the same angle as the said upper converging member, a lamp within the space between the upper converging element and the supplementary wall, a shutter within the casing structure, an aperture in the vertical end wall, and means to open and to close the said shutter with respect to the said aperture.

5. In an apparatus of the character described, a casing having an aperture in its forward end, a shutter element pivotally suspended intermediate the front and rear ends of the said casing and adapted to swing into closed position with its lower edge in spaced relation to the said forward end of the casing and its upper edge in spaced relation to the top wall, and an illuminating means placed within the space intervening between the upper edge of the shutter and the said top wall.

6. In an apparatus of the class described, a casing having forwardly converging upper, lower and side walls, a vertical end wall at the forward extremity of the said casing, an aperture in the said end wall, a shutter suspended within the said casing and adapted to swing in an arc to its open position and to rest in the upper portion of the said casing, a connecting rod adapted to actuate the said shutter, and an auxiliary lighting chamber positioned above the line of the shutter when open, and the said auxiliary lighting chamber opening at its forward end into a position of the main casing in front of the shutter, when the same is in its closed position, substantially as shown and described.

Signed at New York city in the county of New York and State of New York this 16th day of August A. D. 1929.

ERNEST V. HOFFMANN.
JAMES E. SOONS.